United States Patent
Lauer et al.

(10) Patent No.: US 7,503,210 B2
(45) Date of Patent: Mar. 17, 2009

(54) ALLOCATION METHOD FOR A COMBINED TIRE PRESSURE MONITORING SYSTEM IN A MOTOR VEHICLE

(75) Inventors: Peter Lauer, Karben (DE); Stefan Stölzl, Weinheim (DE); Andreas Köbe, Bensheim (DE); Vladimir Koukes, Darmstadt (DE)

(73) Assignee: Continental Teves AG & Co oHG, Frankfurt (DE)

( * ) Notice: Subject to any disclaimer, the term of this patent is extended or adjusted under 35 U.S.C. 154(b) by 481 days.

(21) Appl. No.: 10/571,177

(22) PCT Filed: Sep. 2, 2004

(86) PCT No.: PCT/EP2004/052019

§ 371 (c)(1),
(2), (4) Date: Mar. 9, 2006

(87) PCT Pub. No.: WO2005/025899

PCT Pub. Date: Mar. 24, 2005

(65) Prior Publication Data

US 2007/0075851 A1     Apr. 5, 2007

(30) Foreign Application Priority Data

Sep. 11, 2003     (DE) .................... 103 42 227

(51) Int. Cl.
*B60C 23/02*     (2006.01)
(52) U.S. Cl. .................... 73/146.5; 340/447
(58) Field of Classification Search ........... 73/146.5, 73/146; 340/442, 447
See application file for complete search history.

(56) References Cited

U.S. PATENT DOCUMENTS

| | | | |
|---|---|---|---|
| 6,014,599 A * | 1/2000 | Inoue et al. | 701/29 |
| 6,446,023 B1 * | 9/2002 | Ernst | 702/138 |
| 6,731,205 B2 * | 5/2004 | Schofield et al. | 340/444 |
| 6,802,213 B1 * | 10/2004 | Agrotis | 73/146 |
| 2002/0130771 A1 * | 9/2002 | Osborne et al. | 340/438 |
| 2004/0178897 A1 * | 9/2004 | Fennel et al. | 340/442 |
| 2005/0044946 A1 * | 3/2005 | Agrotis | 73/146.5 |
| 2005/0253696 A1 * | 11/2005 | Mori et al. | 340/445 |

FOREIGN PATENT DOCUMENTS

| | | |
|---|---|---|
| DE | 19926616 | 5/2001 |
| DE | 19938431 | 9/2001 |
| DE | 10152338 | 5/2003 |
| DE | 10302410 | 8/2003 |
| DE | 10238571 | 3/2004 |

* cited by examiner

*Primary Examiner*—Andre J Allen

(57) ABSTRACT

An allocation method combines two tire pressure monitoring systems in motor vehicles being equipped with pressure measuring modules. Each pressure measuring module records a value responsive to the tire inflation pressure and sends the latter to a receiving unit connected to an evaluating device together with an individual identification code (IDx) allocated to the respective pressure measuring module. Signals about the rotational speed of each one wheel being sensed by wheel rotational speed sensors are transmitted to the evaluating device, and since the installation positions y of the wheels at the vehicle are known to the evaluating device, the wheels at the vehicle are known, and the allocation method is performed by taking into consideration established probability values W_IDx_y, with the probability values W_IDx_y describing a frequency distribution which indicates how often pressure measuring modules with the identification codes IDx are detected as pertaining to the installation positions y.

10 Claims, 1 Drawing Sheet

ALLOCATION METHOD FOR A COMBINED TIRE PRESSURE MONITORING SYSTEM IN A MOTOR VEHICLE

BACKGROUND OF THE INVENTION

The present invention relates to an allocation method for a tire pressure monitoring system in motor vehicles combining directly and indirectly monitoring tire inflation pressure.

Systems which enhance the active or passive safety are used at an increasing rate in up-to-date vehicles. As experience shows, many accidents are caused by defective vehicle tires. A large number of these tire defects are due to a wrong tire inflation pressure or a stealthy inflation pressure loss in the tire. Therefore, it is of great significance in terms of safety of the vehicle to reliably monitor the tire inflation pressure.

Two types of tire inflation pressure monitoring systems have become known so far. On the one hand, so-called directly measuring tire pressure monitoring systems (TPMS: Tire Pressure Monitoring System) as described e.g. in DE 199 26 616 C2 or in DE 199 38 431 C2, and so-called indirectly measuring tire pressure monitoring systems (DDS: Deflection Detection System) as described e.g. in DE 100 58 140 A1 are known in the art.

The tire pressure monitoring system with direct measurement (TPMS) measures the respective tire inflation pressure by means of pressure modules directly in the tire concerned, with the result that all wheels are monitored irrespective of each other. The measured tire inflation pressure is sent alone or in conjunction with other measured values (e.g. temperature of the tire) to one or more receiving units arranged at the vehicle, using a transmitting unit which is connected to the pressure measuring module. In this respect, each transmitting unit includes an individual identification code which is sent together with the measured tire inflation pressure and any possible other measured values. The receiving unit which is provided one time or several times relays the data received (measured values and identification codes) to an evaluating device which emits a warning to the driver when tire pressure loss prevails. The direct measurement of the tire inflation pressure permits the directly measuring tire pressure monitoring system (TPMS) to detect tire inflation pressure loss at a very early time already.

The directly measuring tire pressure monitoring system known in the art suffers from the shortcoming that the reliability is very limited on account of the fact that the pressure measuring modules usually are not designed redundantly, on the one hand, while, on the other hand, great expenditure is needed for detecting which tire (e.g. front left tire) suffers from a loss in inflation pressure, because several receiving units are generally necessary to this end in order to achieve a safe allocation of the tires to the installation positions (e.g. front left).

The tire pressure monitoring system with indirect measurement (DDS) is based on the measurement of rotational wheel speeds. The increase in rotational wheel speeds is a standard of the tire inflation pressure because a tire having a lower tire inflation pressure (e.g. 1.0 bar) that differs from the nominal pressure (e.g. 2.0 bar) exhibits a smaller dynamic rolling circumference. Due to this difference in rotational speeds, the tire pressure monitoring system with indirect measurement (DDS) detects tire inflation pressure loss. To determine the rotational wheel speeds, typically those wheel sensors are used which are already provided in a vehicle with an anti-lock system (ABS). These wheel speed sensors are favorable because they are monitored in terms of possible malfunctions or are designed redundantly, with the result that tire inflation pressure loss is detected with a high rate of reliability. As the installation position (e.g. front left) of the wheel sensors is known to the tire pressure monitoring system with indirect measurement (DDS), the allocation of a wheel with tire inflation pressure loss to its installation position is simple. Further, this system is very moderate in price because the necessary wheel sensors are already mounted at least in vehicles equipped with ABS.

It is disadvantageous in the known tire pressure monitoring system with indirect measurement (DDS) that a simultaneous tire inflation pressure loss on all wheels cannot be detected because a difference in the rotational speeds of the wheels cannot be detected in the event of a simultaneous tire inflation pressure loss.

Further, there are combined tire pressure monitoring systems linking a tire pressure monitoring system with direct measurement to a tire pressure monitoring system with indirect measurement. A combined tire pressure monitoring system of this type is described in DE 101 52 338 A1. The prior-art combined tire pressure monitoring system, for cost reasons, manages without taking into account the individual identification code, which is usually sent along with the measured tire inflation pressure and any possible other measured valued from the transmitting unit connected to the pressure measuring module to the receiving unit. It is disadvantageous in this arrangement that in case two or more vehicles are placed side by side, the evaluating device is unable to identify which tire inflation pressure sent belongs to the own vehicle.

In view of the above, an object of the invention is to provide an allocation method for a combined tire pressure monitoring system which permits a low-cost and reliable allocation of the vehicle wheels to the respective installation positions.

SUMMARY OF THE INVENTION

According to the invention, this object is achieved by an allocation method taking into consideration established probability values W_IDx_y describing a frequency distribution which indicates how often pressure measuring modules with the identification codes IDx are identified as pertaining to the installation positions y.

In a favorable embodiment of the allocation method of the invention, a counter C_IDx_y is made available for each possible combination of a pressure measuring module with an identification code IDx and an installation position y.

In another preferred embodiment of the allocation method, an identification code counter C_IDx is initialized for each pressure measuring module with an identification code IDx.

Further features and advantages of the allocation method of the invention will be described in the following by making reference to an embodiment.

DETAILED DESCRIPTION OF THE DRAWING

Figure 1:
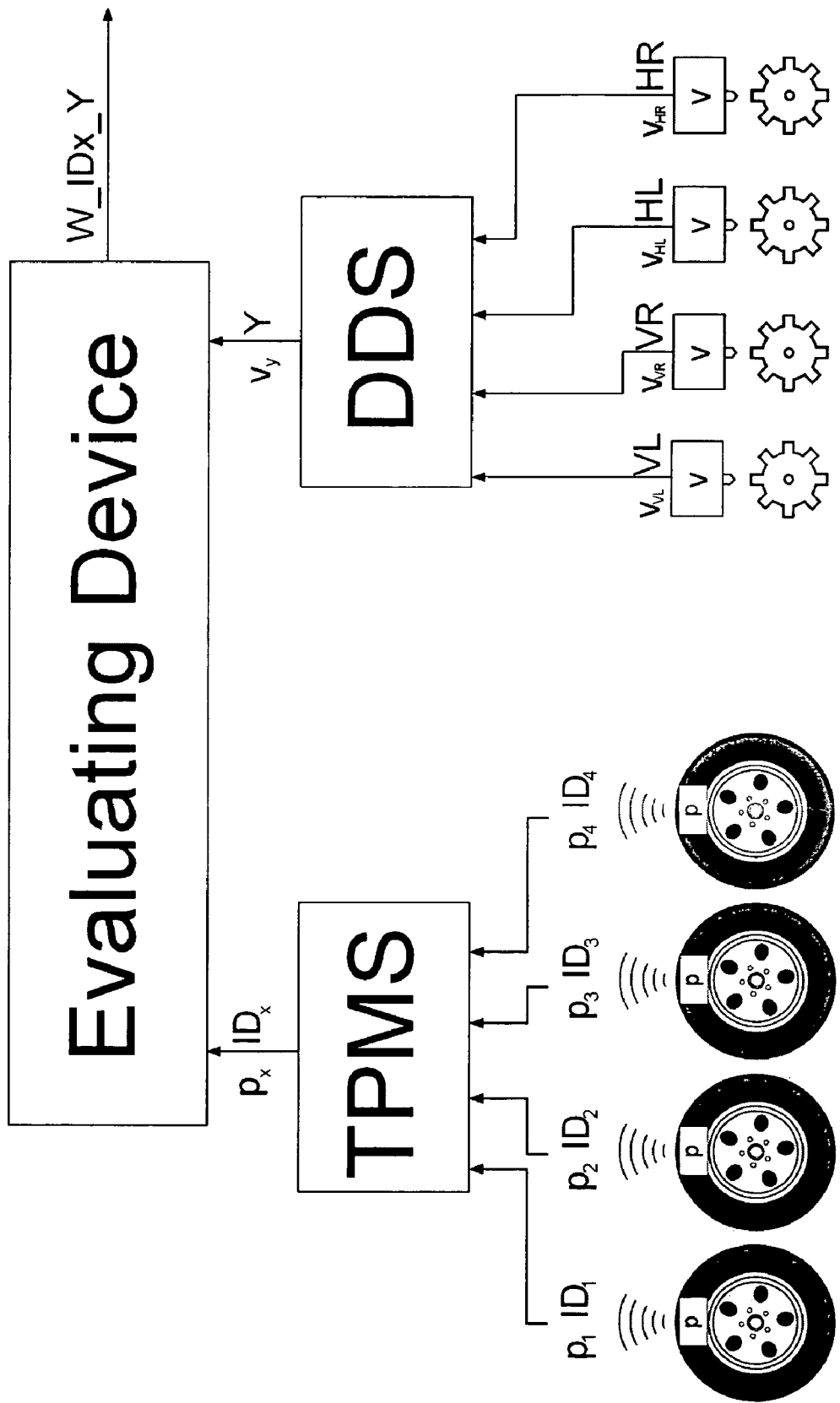
FIG. 1 shows a combined tire pressure monitoring system according to the present invention.

The combined tire pressure monitoring system is herein based on a tire pressure monitoring system with direct measurement (TPMS) and a tire pressure monitoring system with indirect measurement (DDS).

The tire pressure monitoring system with direct measurement (TPMS) uses a transmitting unit arranged in or at the vehicle wheel to send wheel-individual tire inflation pressures together with individual identification code, hereinbelow referred to as IDx, to a receiving unit connected to an evaluating device. As this occurs, the tire inflation pressures of each individual wheel are sensed by so-called pressure measuring modules. Thus, the evaluating device receives from each vehicle wheel an individual tire inflation pressure and an individual identification code (IDx). The directly measuring tire pressure monitoring system of the invention includes a pressure measuring module per wheel. If fewer pressure measuring modules than wheels are provided, the tire inflation pressures of the remaining wheels can be found out in this case by means of the tire pressure monitoring method with indirect measurement that will be described hereinbelow.

The tire pressure monitoring system with indirect measurement (DDS) detects a tire inflation pressure loss from rotational wheel speeds being measured by means of wheel sensors. Usually the wheel sensors which are already used in a vehicle equipped with ABS to determine the rotational performance of the wheels are also used for the tire pressure monitoring system with indirect measurement (DDS). In this case, the wheel sensors have already been allocated to an installation position, e.g. wheel sensor at the front left wheel. Hence, it is also known to the tire pressure monitoring system with indirect measurement (DDS) at which installation position a tire inflation pressure loss is identified.

The tire pressure monitoring system with direct measurement (TPMS) detects when at least one tire inflation pressure is changing. This change of the at least one tire inflation pressure is also detected by the tire pressure monitoring system with indirect measurement (DDS). The information of both systems is processed statistically in order to establish an allocation of the IDx (from TPMS) to the wheel positions (from DDS).

Thresholds are defined to detect tire inflation pressure loss and the tire pressure monitoring system (TPMS) with direct measurement identifies tire inflation pressure loss when values drop below the above thresholds. For example, a normal tire inflation pressure of 2.0 bar is taken as a basis. A tire inflation pressure of 1.5 bar is e.g. defined as a threshold. When one pressure measuring module or several pressure measuring modules furnish a tire inflation pressure ranging below the threshold of 1.5 bar, the evaluating device concludes tire inflation pressure loss. Now a check is made whether the tire pressure monitoring system with indirect measurement (DDS) detects the installation position of the wheels concerned. To this end, a counter C is initialized for each possible combination of the individual identification code (IDx) of the pressure measuring modules and the installation positions. With four installation positions y (VL: front left; VR: front right; HL: rear left; HR: rear right) and four pressure measuring modules IDx (ID1: identification first pressure measuring module; ID2: identification second pressure measuring module; ID3: identification third pressure measuring module; ID4: identification fourth pressure measuring module), 16 counters C_IDx_y will thus result in total. For example, C_ID1_VL means that the counter of the identification code ID1 in a combination with the left front wheel is concerned. In addition, four identification code counters C_IDx (x: 1, 2, 3, 4) are made available which find out how frequently a change in pressure is supplied by a pressure measuring module with the pertinent identification code (IDx).

If, for example, the pressure measuring module with the identification code ID1 indicates a tire inflation pressure loss and the tire pressure monitoring system with indirect measurement (DDS) detects e.g. at the installation position left front (VL) likewise a tire inflation pressure loss, the counter C_ID1-VL will be raised by a defined value (e.g. '1'). Further, the identification code counter C_ID1 is also raised by a defined value (e.g. '1'). When two pressure measuring modules indicate changes in pressure (e.g. ID1 and ID2) and the tire pressure monitoring system with indirect measurement (DDS) detects a change in pressure at two wheels (e.g. VL and VR), then the counters for all combinations possible in this case will be counted upward by '0.5' (in our example C_ID1_VL, C_ID1_VR, C_ID2_VL, C_ID2_VR). Further, all possible combinations (C_ID3_HL, C_ID3_HR, C_ID4_HL, C_ID4_HR) of the remaining identification codes (ID3 and ID4) with the remaining installation positions (HR and HL) are raised by '0.5' because these combinations are bound to occur when the identification codes ID1 and ID2 are allocated to the installation positions VL and VR. In addition, all identification code counters (C_ID1, C_ID2, C_ID3 and C_ID4) are also raised by '1' in each case.

When three pressure measuring modules show a change in pressure (e.g. ID1, ID2 and ID3) and the tire pressure monitoring system with indirect measurement (DDS) detects three installation positions (e.g. VL, VR and HL) where a change in pressure prevails, the installation position of the fourth wheel will be allocated undoubtedly thereby. In the example, pressure measuring module with the identification code ID4 does not show a change in pressure, and no change in pressure was identified at the installation position HR. Thus, the counter C_ID4_HR for this combination and the identification code counter C_ID4 are respectively counted upward by '1'.

When one (or more) of the identification code counters (C_ID1, C_ID2, C_ID3 or C_ID4) reaches or exceeds a predetermined maximum value C_IDmax (e.g. C_ID1>C_IDmax), then four probability values W_ID1_y (y: VL, VR, HL, HR) are calculated for these identification code ID1. In our example, the following probability values are calculated:

$$W\_ID1\_VL = \frac{C\_ID1\_VL}{C\_ID1};$$

$$W\_ID1\_VR = \frac{C\_ID1\_VR}{C\_ID1};$$

$$W\_ID1\_HL = \frac{C\_ID1\_HL}{C\_ID1};$$

$$W\_ID1\_HR = \frac{C\_ID1\_HR}{C\_ID1}$$

The allocation of an identification code (IDx) to an installation position y occurs when a probability value W_IDx_y exceeds a probability threshold Wmax and is considerably higher than all other calculated probabilities. For example, the following probabilities or dependencies result:

W_ID1_VL>Wmax
W_ID1_VL>>W_ID1_VR and
W_ID1_VL>>W_ID1_HL and
W_ID1_VL>>W_ID1_HR

Thus, the pressure measuring module with the identification code ID1 is allocated to the installation position left front (VL).

The counters (C_IDx and C_IDx_y) mentioned in the allocation method of the invention represent only one embodiment for determining the required probability values W_IDx_y. Of course, other known methods such as the setting of a flag, etc., can be employed in order to determine a frequency distribution between the pressure measuring modules with the identification codes IDx and the installation positions y. Besides, it is not imperative to provide 16 counters C_IDx_y. It is also sufficient, yet with a slightly lower rate of detection reliability than in the embodiment mentioned above, to consider only 12 counters C_IDx_y, in which case only three pressure measuring modules are allocated to their installation positions. The fourth pressure module would be allocated automatically to the remaining installation position in such a case.

The invention claimed is:

1. An allocation method for a combined tire pressure monitoring system in motor vehicles, at least partly comprising wheels with pneumatic tires being equipped with pressure measuring modules, and each pressure measuring module records a tire inflation pressure or a value responsive to the tire inflation pressure and sends the latter to a receiving unit connected to an evaluating device by using a transmitting unit connected to the respective pressure measuring module together with an individual identification code (IDx) allocated to the respective pressure measuring module, and wherein signals about the rotational speed of each one wheel being sensed by means of wheel rotational speed sensors are transmitted to the evaluating device, and the installation positions y (VL: front left, VR: front right, HL: rear left, HR: rear right) of the wheels at the vehicle are known to the evaluating device,
wherein the allocation method comprises the step of taking into consideration established probability values W_IDx_y, the probability values W_IDx_y describing a frequency distribution which indicates how often pressure measuring modules with the identification codes IDx are identified as pertaining to the installation positions y.

2. The allocation method as claimed in claim 1, wherein the allocation method including the step of allocating a pressure measuring module with an identification code IDx to an installation position y when the probability value W_IDx_y of the pressure measuring module with the identification code IDx is higher than a probability threshold W_max and is considerably higher than all other calculated probability values.

3. The allocation method as claimed in claim 1, wherein the probability values W_IDx_y are calculated when an identification code counter C_IDx has reached or exceeded a predetermined maximum value C_IDmax.

4. The allocation method as claimed in claim 3, including the step of raising the identification code counter C_IDx by a fixed value when a pressure measuring module with the associated identification IDx records a tire inflation pressure which falls below a threshold, and tire inflation pressure loss is inferred from this condition.

5. The allocation method as claimed in claim 1, wherein a count of a counter C_IDx-Y describes a frequency how often a pressure measuring module with the identification code IDx is allocated to an installation position y.

6. The allocation method as claimed in claim 5, including the step of raising the count of the counter C_IDx_y by a first fixed value when exactly one pressure measuring module with the identification code IDx is allocated to exactly one installation position y.

7. The allocation method as claimed in claim 5, including the step of raising the counts of several counters C_IDx_y by a second fixed value when several pressure measuring modules with the respective identification codes IDx are allocated to several installation positions y.

8. The allocation method as claimed in claim 5, wherein the probability values W_IDx_y are obtained essentially by producing quotients from the counters C_IDx_y and identification code counters IDx.

9. The allocation method as claimed in claim 1, wherein the installation position y is identified when at least one wheel rotates faster than at least one other wheel.

10. A system for the allocation of tires of a vehicle, comprising pressure measuring modules, a receiving unit, an evaluating device, each pressure measuring module capable of recording a value corresponding to the tire inflation pressure and of sending the latter to the receiving unit connected to the evaluating device by using a transmitting unit connected to the respective pressure measuring module together with an individual identification code (IDx) allocated to the respective pressure measuring module,
the system further comprising wheel rotational speed sensors capable of providing signals about the rotational speed of each one wheel being sensed and and identification codes identifying the installation positions y (VL: front left, VR: front right, HL: rear left, HR: rear right) of the wheels to the evaluating device,
wherein the evaluating device is capable of taking into consideration established probability values W_IDx_y, the probability values W_IDx_y describing a frequency distribution which indicates how often pressure measuring modules with the identification codes IDx are identified as pertaining to the installation positions y.

* * * * *